2,733,251

MOLECULAR REARRANGEMENT PROCESS

Harold Kenneth Hawley, Woodlawn, and Robert D. Dobson, Green Hills, Ohio, assignors to The Procter & Gamble Company, Cincinnati, Ohio, a corporation of Ohio No Drawing. Application September 2, 1954,
Serial No. 453,971

15 Claims. (Cl. 260—410.7)

The present invention relates to catalysis of molecular rearrangement processes, and more particularly to the catalysis of interesterification reactions as applied to glycerides.

The use of alkali metals, such as sodium and potassium, to catalyze molecular rearrangement reactions in glycerides is well known, but to our knowledge, the manner of such prior use, at least in part necessitated by the physical properties of the alkali metal, has not led to realization of the maximum effectiveness in catalyst activity. The processes of the prior art have either involved dispersion of the sodium or potassium in the glyceride at substantially elevated temperatures, or have involved the addition to the glyceride of preformed dispersions of the solid alkali metal in an inert, non-aqueous solvent such as xylene, toluene, or kerosene fractions.

In the first instance, those temperatures which are required to melt sodium and potassium are in a range of temperatures conducive to undesirable side reactions with the glyceride, thus resulting in a marked reduction of the catalytic activity of the alkali metal, and in a darkening and even charring of the glyceride being treated. Potassium and sodium melt at about 145° F. and 208° F., respectively, and, according to our experience, the exposure of the glyceride to such highly active alkali metals at temperatures substantially above 120° F., even for short periods of time, results in appreciable reduction in catalyst activity and quality of the glyceride derived from the treatment.

If, for example, the molecular rearrangement reaction is conducted at the temperature of dispersion or perhaps at some lower temperature which, however, is above the melting point of the sodium or potassium, the aforementioned undesirable side reactions proceed to an objectionable degree. Even exposure of the glyceride to the sodium or potassium at such temperatures for short periods of time, as are normally required for dispersion and activation of the catalyst, has adverse effect on the catalytic activity in subsequent operations at temperatures below 120° F. Thus, we have found that dispersion of sodium in lard at 250° F., at a conventional concentration of about 0.2%, has resulted in complete inactivation of the sodium for catalysis of subsequent directed rearrangement of the lard at temperatures in the range of 80°–90° F. Such inactivation is not observed in practicing the present invention, and presumably at the higher temperatures of prior practice, the sodium or the active catalyst formed therefrom is consumed or poisoned in side reactions.

In the second instance, the use of preformed dispersions of solid alkali metal in suitable solvent obviously embodies the addition of the solvent as a foreign substance, which, in the case of edible products, must later be removed at some stage of processing to enable intended use. The step of deodorization, of course, can be conducted in such manner as to accomplish solvent removal, but it is difficult to recover the solvent economically in a form which permits reuse, and therefore employment of the solvent as a dispersion vehicle usually represents a net loss. Moreover, in commercial installations, the handling of combustible solvents presents undesirable fire and explosion hazards.

In addition, when temperatures of molecular rearrangement are below the melting point of the sodium or potassium, the alkali metal exists as a solid phase, which, even though of malleable nature and finely dispersed throughout the glyceride, shows not only some resistance to preliminary activation but also a susceptibility to poisoning.

It is an object of the present invention to provide an improved catalytic material of the alkali metal class for molecular rearrangement reactions.

A further object is to provide for molecular rearrangement reactions an alkali metal catalyst which is outstanding in its ability to become activated and to catalyze the rearrangement reaction thereafter.

Another object is to provide for glyceride rearrangement reactions a catalytic material which has improved activity at or in the range of room temperatures and which is readily dispersible in the glyceride at such temperatures without the need for a dispersing fluid.

We have found that the above objects are achieved and that the disadvantages of prior teachings are obviated by the use, at temperatures not substantially higher than 120° F., of a metallic sodium and potassium alloy which is liquid at such temperatures. While sodium and potassium each have melting points above 120° F., certain mixtures or alloys of the two metals have melting points which are much lower than the melting point of either constituent. The present invention is therefore directed to the process of conducting glyceride rearrangement reactions with the aid of liquid sodium-potassium alloys which have melting points not substantially higher than 120° F. Alloys meeting this specification are those having by weight about 75% to about 3% sodium and about 25% to about 97% potassium. The lowest melting alloy within this composition range, having a melting point of about 10° F., contains about 77% potassium and about 23% sodium.

Those compositions containing from about 50% to about 15% sodium and about 50% to about 85% potassium are particularly suitable for low temperature directed rearrangement reactions since their melting points are below 50° F. For general use, serving demand for economy and liquidity, the 50–50 alloy is preferred.

Sodium-potassium alloys coming within the range of compositions above disclosed are available on the market, a commercial method of preparation involving first, the passage of sodium vapor through fused potassium chloride whereby a mixture of potassium and sodium vapors is formed, and second, appropriate fractionation of the vapor mixture.

In the use of the sodium-potassium alloy in accordance with the present invention, the same precautions are observed as in the customary use of sodium or potassium alone. Thus, for example, any free fatty acids, peroxides, and moisture present in the glycerides tend to consume the catalytic material and sufficient alkali metal must be used to insure an excess over that which might be inactivated by the presence of such materials. In general, an excess of 0.02%, calculated as percent sodium, has been found to give a reasonable reaction rate, and greater amounts may of course be used, but for economic reasons such amounts do not normally exceed 1%. If the acid and moisture in the glyceride is such as to require such larger usage, thus it is usually more economical to purify the glyceride as by preliminary alkali refining and/or drying steps. We have found that in treatment of glyceride fats such as dry lard, for example, having a fatty acid content of 0.25% to 0.5%, an amount of 50–50 alloy equal to 0.2% to 0.5% (calculated as sodium) of the glyceride is usually adequate.

The liquid sodium-potassium alloy can be dispersed directly in the glyceride by means of conventional mechanically agitated dispersing equipment adapted for use with liquids, an example being the Premier Dispersator manufactured by the Premier Mill Corporation of Geneva, New York. This is an enclosed mixing device having a relatively small barrel-shaped rotor cage mounted on a vertical axis, this cage being driven at very high speed (from about 15,000 R. P. M. in smaller models to about 3,600 R. P. M. in larger units) and being adapted to suck the heavier liquid into its open lower end and to sling, by centrifugal force, subdivided portions of this heavier liquid into the surrounding lighter liquid through vertical slits in its outer wall. Other dispersing devices of well known design, preferably employing a centrifugally induced shearing action, will serve the purpose. Expensive special equipment, such as a homogenizer or a colloid mill, although suitable for the purpose, is not necessary. However, it should be pointed out that the efficiency of the alloy in catalysis has been found to be in part dependent on its droplet size in the dispersion, higher efficiencies being observed with smaller droplets. It is preferable, therefore, that the intensity of agitation during dispersion be such as to give an average droplet diameter not substantially exceeding 50 microns.

According to our observations the sodium-potassium alloy does not immediately possess catalytic activity on introduction into the glyceride, but rather requires a brief period for activation, after which catalytic activity is noted. This may be due to the reaction of the alloy with glyceride or fatty material in some way to produce the actual catalyst, although we do not wish to be bound by such theoretical considerations.

The use of the present alloys has not only resulted in shorter activation periods but also in appreciably higher activity in bringing the rearrangement reaction to equilibrium. This is particularly advantageous in the production of directedly rearranged glycerides wherein sufficiently low reaction temperatures are employed to permit crystallization of higher melting triglycerides formed during the course of interesterification. In many instances of such treatment, the temperature will be below 120° F., such as 40° F. to 95° F., depending on the glyceride being processed.

The ability of the alloy to become activated in a relatively short time and to maintain an outstanding high degree of activity throughout the rearrangement reaction is perhaps directly due to the existence of the alloy as droplets, rather than malleable or plastic solid particles, in the presence of the glyceride during reaction. A liquid is more readily dispersed in finely divided form than a semi-solid, and it would appear that complete poisoning of the catalyst as by formation of coatings on the particles, would be delayed in the case of a liquid droplet, which, compared to a semi-solid particle, is relatively easy to deform or subdivide, thereby presenting a fresh surface for catalysis during the reaction.

The manner in which the sodium-potassium alloys are employed will be readily evident from the following examples, which are to be considered exemplary and not limiting as regards the breadth of the invention.

In these examples a standardized procedure for determining the "cloud point" was employed to obtain a rough measure of the extent of rearrangement. In the cloud point procedure a portion of the material to be examined is heated to about 60° C. and is placed in a tall form electrolytic type beaker (Corning No. 1140). Means for agitating the sample and for reading its temperature are provided. A flowing stream of cold water at a temperature of less than about 7° C. is passed around the outside of the beaker at such a rate that the temperature of the glyceride mixture in the beaker drops from 60° to 40° C. in about 1 minute. A beam of white light is passed through the beaker and the sample, the transmitted beam intensity being such that a photocell registers 2 microamperes while the sample is wholly liquid. The temperature at which the transmitted beam intensity is reduced to 31.4% of its initial intensity as a result of crystal formation throughout the sample is taken as the cloud point temperature.

*Example 1.*—Vacuum dried prime steam lard having a cloud point of 17.4° C. was used in this example. To 2,000 parts of this lard under a nitrogen blanket at a temperature of 97° F. were added 5.4 parts of a sodium-potassium alloy constituted of equal parts by weight of sodium and potassium. The mixture of liquid lard and alloy was then mechanically agitated vigorously to achieve dispersion of the alloy throughout the lard in very finely divided form. At the end of about 2½ minutes' mixing time, the color of the mixture changed from light gray to brown, indicating that the catalyst had become activated and that interesterification was taking place. At the end of 5 minutes' total mixing time, the agitation was stopped, the temperature having risen to about 115° F. About ⅔ of the reacted mixture was removed and treated with an excess of water to inactivate the catalyst and hydrate the soaps formed by reaction of fatty material with the alkali metal alloy. Thereafter the mixture was settled and the treated oil was filtered to remove suspended sodium and potassium soaps. The cloud point on the thus treated lard was 22.6° C., an increase of 5.2° C. over the cloud point of the original lard. This change in cloud point was sufficient to indicate that substantial interesterification had been effected. The five minute reaction period required to obtain this result was much shorter than that required with metallic sodium even at substantially higher temperature.

*Example 2.*—The remaining ⅔ of the mixture of Example 1 was transferred to a heavy-duty mixing device especially adapted to effect the mixing of thick viscous substances or slurries. The mixture of glyceride and catalyst was agitated and cooled in the mixer to about 72° F. in about 10 minutes. This cooling brought about crystallization of a substantial portion of higher melting glycerides. Agitation of the slurry was continued and the stock temperature was allowed to rise to 80°–85° F. as a result of liberation of the heat of crystallization, and was then held between these temperature limits for a period of one hour. At the end of this time, the catalyst was first inactivated with an excess of water while the temperature was held within the 80°–85° F. range, and the resulting mixture was then heated to 120° F. to melt the solidified portion of the fat. The soaps formed by reaction of the alkali metal with the fat were allowed to settle and the decanted oil was filtered to remove suspended sodium and potassium soaps. The cloud point on the filtered oil was found to be 29.4° C., a 6.8° C. rise over the rearranged product of Example 1 and a 12° C. rise over the original lard, indicating that a substantial portion of the combined saturated fatty acids in the lard had been converted to trisaturated glycerides which did not exist in the original or in the Example 1 compositions.

An equal amount by weight of a 60–40 potassium-sodium alloy can be employed in the practice of Examples 1 and 2 with substantially equal results.

The improvement in the speed of catalyst activation and of catalysis resulting from the use of the liquid sodium-potassium alloy in accordance with our invention, is of outstanding advantage in continuous glyceride rearrangement processes, both of the random and of the directed type. Such improvements have made possible the simplification in design of equipment and have resulted in economies due to the permissible use of smaller "holding" or reacting tanks, coils, etc. The following example is exemplary of a continuous process for producing a directedly rearranged lard shortening product.

*Example 3.*—Prime steam lard having a cloud point of 18.6° C. was continuously heated to about 330° F. and pumped at a rate of 100 pounds per hour through a two-stage vacuum drying unit which reduced the moisture content of the lard to about 0.01%. The stream of lard leaving the vacuum drier was continuously cooled to a temperature of 104°–103° F. and was continuously pumped without exposure to air to a high speed mixing and dispersing device (Dispersator) having sufficient volumetric capacity to provide a "hold" or "dwell" time of about 3 minutes. At the point of introduction of the dried lard into this mixer there was also continuously introduced a stream of a 50–50 sodium-potassium alloy at a rate of 0.23 pound per hour. The dispersion of finely divided alloy in lard leaving the mixer was then continuously passed through a coil of sufficient volume to provide a "hold" time of about 15 minutes. The mixture leaving this coil had a temperature of 108°–110° F., and a sample taken at this point, after treatment to inactivate catalyst and remove soap stock, had a cloud point of 23.9° C., indicating substantial interesterification of the lard.

The mixture of liquid lard and catalyst leaving the reaction coil was discharged into a small surge tank from which it was pumped continuously through a standard scraped-wall heat exchanger in which the "hold" time was about 0.5 minute. The stock leaving the heat exchanger had a temperature of 68°–71° F. and contained a heavy cloud of fine crystallized fat solids. This partially crystallized mixture was next passed continuously through a small "picker" tube in which the mixture was agitated for an average time of about 2½ minutes. Interesterification with simultaneous precipitation of insoluble glycerides proceeded rapidly in the picker box as shown by the fact that the temperature of the mixture leaving the picker box had risen to 81°–83° F. without the addition of external heat. Such directed interesterification was confirmed by a cloud point analysis of 29.7° C. on the interesterified lard at this point. The rate of directed interesterification thus far noted in the process of this example was substantially greater than that which had been experienced with the use of other catalytic materials.

For some purposes, the degree of directed rearrangement thus far effected in this example is sufficient, and the catalyst can be immediately inactivated without substantial change in temperature to preserve the reactants formed. For other purposes, however, the reaction can be carried to a greater degree of completion, but it should be understood that the rate of the directional reaction is somewhat lower, and this is demonstrated by further processing as follows.

Without inactivating the catalyst, the mixture resulting from the above treatment was passed through a second scraped-wall heat exchanger having a "hold" time of about five minutes. The mixture leaving this second heat exchanger had a temperature of 69°–72° F. This mixture was thence passed continuously through a large reactor equipped with means for gently agitating the slurry of liquid and solid fat undergoing directed interesterification. This reactor had a "hold" time of about 1½ hours, the stock leaving the reactor being at a temperature of 86°–90° F.

While the temperature of the stock leaving the reactor was still within the range of 86°–90° F., sufficient water was added to neutralize the catalyst and to hydrate soaps formed during the reaction. Subsequently the melted interesterified lard, which now had a cloud point of the order of 31.7° C. was separated from soap stock and processed into an acceptable finished shortening in a conventional manner.

*Example 4.*—To 3 parts by weight of refined, bleached and deodorized cottonseed oil having a cloud point of 3.3° C. were added .015 part by weight (0.5%) of a sodium-potassium alloy constituted of equal parts by weight of sodium and potassium. The temperature of the oil at the time of the addition of catalyst was 79° F. The mixture was mechanically and vigorously agitated with a Premier Dispersator under an atmosphere of nitrogen, effecting dispersion of the alloy throughout the oil in finely divided form. At the end of four minutes' agitation, the color of the mixture became brown, indicating that the catalyst had become activated. At the end of a total mixing time of 13 minutes, the agitation was stopped, the temperature having risen to 118° F. The catalyst was then inactivated by incorporating about .15 part by weight of water. The potassium and sodium soaps were allowed to settle and the decanted oil was filtered to remove suspended soap particles. The cloud point on the filtered oil was determined as 11.9° C., an 8.6° C. rise over the cloud point of the original oil, indicating that a substantial rearrangement in fatty acid radicals, or interesterification, had been effected.

*Example 5.*—Example 4 was repeated using a sodium-potassium alloy catalyst constituted of 10% by weight of sodium and 90% by weight of potassium. The initial temperature was 82° F., the total time of reaction was 20 minutes (agitation being discontinued after 13 minutes), and the final temperature was 116° F. The cloud point of the oil was increased from 3.3° C. to 13.8° C. indicating substantial interesterification.

The above examples deal with the molecular rearrangement of lard and cottonseed oil as catalyzed by the addition of the sodium-potassium alloy, but it is to be understood that, as is well known in the art, all animal, vegetable, and marine glyceride fats and oils can be modified in molecular structure by application of the rearrangement reaction. Therefore the process is equally applicable with corresponding advantages in the treatment of all other glycerides, especially those which are constituted of combined fatty acids whose molecular structures differ in respects affecting solubility of glycerides thereof in the glyceride system, including tallow, palm oil, cottonseed oil, soybean oil, linseed oil, coconut oil, and the like, as well as mixtures thereof. Also the invention can be employed with advantages in other molecular rearrangement reactions.

Having thus described our invention, what we claim and desire to secure by Letters Patent is:

1. In the process of catalytically effecting rearrangement of fatty acid radicals in a mixture of glycerides, the steps of introducing into said glyceride mixture, for catalysis, a sodium-potassium alloy containing from about 75% to about 3% sodium and from about 25% to about 97% potassium, agitating the mixture of glyceride and alloy at a temperature at which said alloy is liquid, but not substantially higher than 120° F., and thereby dispersing said alloy throughout the glyceride, and effecting molecular rearrangement.

2. The process of claim 1 in which the glyceride mixture is lard.

3. The process of claim 1 in which the alloy contains from about 50% to 15% sodium and from about 50% to 85% potassium.

4. The process of claim 1 in which the alloy is about 50% sodium and about 50% potassium.

5. The process of claim 1 in which the catalytic amount of sodium-potassium alloy, based on the glyceride mixture, is within the range of 0.2% to 1% by weight, calculated as sodium.

6. In the process of catalytically effecting molecular rearrangement of glycerides, the steps of introducing into a liquid mixture of glycerides, for catalysis, a liquid sodium-potassium alloy containing from about 50% to about 15% sodium and from about 50% to about 85% potassium, dispersing the alloy throughout said mixture of glyceride at a temperature not substantially higher than 120° F., effecting molecular rearrangement, and inactivating the catalyst.

7. The process of claim 6 in which the alloy is dispersed in the form of droplets averaging not substantially more than 50 microns in diameter.

8. In the process of catalytically effecting molecular rearrangement of glycerides, the steps of introducing into a mixture of glycerides, of which a substantial portion is in molten condition, a liquid sodium-potassium alloy containing from about 75% to about 3% sodium and from about 25% to about 97% potassium, dispersing said liquid alloy throughout said mixture of glycerides at a temperature not substantially higher than 120° F., whereby activation of catalyst is effected, permitting rearrangement to take place at a temperature not substantially higher than 120° F. but at a temperature at which the alloy remains liquid, and inactivating the catalyst.

9. In the process of catalytically effecting molecular rearrangement of glycerides, the steps of introducing, for catalysis, a flowing stream of liquid sodium-potassium alloy containing from about 50% to about 15% sodium and from about 50% to about 85% potassium into a flowing stream of a mixture of glycerides, the temperature of the combined constituents being not substantially in excess of 120° F., subjecting the combined streams to a mixing and dispersing action whereby activation of catalyst is effected, permitting rearrangement to take place at a temperature not substantially higher than 120° F., and inactivating the catalyst.

10. In the process of catalytically effecting molecular rearrangement of glycerides, the steps of introducing, for catalysis, a flowing stream of a liquid sodium-potassium alloy containing from about 50% to about 15% sodium and from about 50% to about 85% potassium into a flowing stream of a mixture of glycerides, the temperature of the combined constituents being not substantially in excess of 120° F., subjecting the combined streams to a mixing and dispersing action whereby activation of catalyst is effected, effecting rearrangement at a temperature not substantially lower than 50° F. and not substantially higher than 120° F., and inactivating the catalyst.

11. The process of claim 10 in which the rearrangement reaction is accompanied by the precipitation of solid glycerides formed during the course of rearrangement.

12. The process of claim 11 in which the rearrangement reaction is performed on lard.

13. In the process of catalytically effecting rearrangement of fatty acid radicals in a mixture of glycerides, the steps of introducing into said glyceride mixture, for catalysis, a sodium-potassium alloy containing from about 75% to about 3% sodium and from about 25% to about 97% potassium, agitating the mixture of glyceride and alloy at a temperature at which said alloy is liquid, but not substantially higher than 120° F., and thereby dispersing said alloy throughout the glyceride mixture, and effecting molecular rearrangement at a temperature at which the alloy remains liquid, but not above 120° F.

14. The process of claim 13 in which the catalytic amount of sodium-potassium alloy, based on the glyceride mixture, is within the range of 0.2% to 1% by weight, calculated as sodium.

15. In the process of catalytically effecting molecular rearrangement of glycerides, the steps of introducing into a liquid mixture of glycerides, for catalysis, a liquid sodium-potassium alloy, containing from about 50% to about 15% sodium and from about 50% to about 85% potassium, dispersing the alloy throughout said mixture of glyceride at a temperature at which the alloy is liquid, but not substantially higher than 120° F. effecting molecular rearrangement at a temperature at which the alloy remains liquid, but not above 120° F., and inactivating the catalyst.

No references cited.